United States Patent
Larsson et al.

(10) Patent No.: US 11,682,384 B2
(45) Date of Patent: Jun. 20, 2023

(54) METHOD, SOFTWARE, AND DEVICE FOR TRAINING AN ALARM SYSTEM TO CLASSIFY AUDIO OF AN EVENT

(71) Applicant: Axis AB, Lund (SE)

(72) Inventors: Ingemar Larsson, Lund (SE); Daniel Andersson, Lund (SE)

(73) Assignee: Axis AB, Lund (SE)

( * ) Notice: Subject to any disclaimer, the term of this patent is extended or adjusted under 35 U.S.C. 154(b) by 71 days.

(21) Appl. No.: 17/182,526

(22) Filed: Feb. 23, 2021

(65) Prior Publication Data
US 2021/0272555 A1   Sep. 2, 2021

(30) Foreign Application Priority Data
Feb. 27, 2020   (EP) .................................... 20159770

(51) Int. Cl.
*G10L 15/16* (2006.01)
*G06N 3/08* (2023.01)
(Continued)

(52) U.S. Cl.
CPC ............... *G10L 15/16* (2013.01); *G06N 3/08* (2013.01); *G08B 23/00* (2013.01); *G10L 25/30* (2013.01); *G10L 25/51* (2013.01)

(58) Field of Classification Search
CPC ......... G10L 15/16; G10L 25/30; G10L 25/51; G06N 3/08; G08B 23/00
(Continued)

(56) References Cited

U.S. PATENT DOCUMENTS 5,467,428 A    11/1995  Ulug
10,276,187 B2*  4/2019  Gross ..................... G08B 21/22
(Continued)

FOREIGN PATENT DOCUMENTS

WO    2008/055306 A1    5/2008
WO    2018/194243 A1   10/2018
(Continued)

OTHER PUBLICATIONS

R. Rezvani, M. Katiraee, A. H. Jamalian, S. Mehrabi and A. Vezvaei, "A new method for hardware design of Multi-Layer Perceptron neural networks with online training," 2012 IEEE 11th International Conference on Cognitive Informatics and Cognitive Computing, 2012, pp. 527-534, doi: 10.1109/ICCI-CC.2012. (Year: 2012).*
(Continued)

*Primary Examiner* — Bharatkumar S Shah
(74) *Attorney, Agent, or Firm* — Volpe Koenig

(57) ABSTRACT

A method for training an alarm system to classify audio of an event, wherein the alarm system is connected to a neural network trained to classify audio as an event type, the method comprising the steps of: receiving audio recorded during a first period of time; transmitting the audio to an external unit; receiving data from the external unit indicating a sub-period of time of the audio and data indicating an event type of the indicated sub-period of time of the audio; and re-training the neural network by inputting a sub-period of the audio corresponding to the indicated sub-period of time of the audio and using the indicated event type as a correct classification of the sub-period of the audio.

15 Claims, 3 Drawing Sheets

(51) Int. Cl.
*G08B 23/00* (2006.01)
*G10L 25/30* (2013.01)
*G10L 25/51* (2013.01)

(58) Field of Classification Search
USPC .......................................................... 704/231
See application file for complete search history.

(56) References Cited

U.S. PATENT DOCUMENTS

| | | | |
|---|---|---|---|
| 10,810,854 B1 * | 10/2020 | Correnti | ................... G08B 1/08 |
| 2016/0133108 A1 | 5/2016 | Bucsa et al. | |
| 2018/0108369 A1 | 4/2018 | Gross | |
| 2019/0391788 A1 * | 12/2019 | Blake | ...................... G06F 16/61 |

FOREIGN PATENT DOCUMENTS

| | | | | |
|---|---|---|---|---|
| WO | 2019/159103 A1 | 8/2019 | | |
| WO | 2019/166296 A1 | 9/2019 | | |
| WO | WO-2019166296 A1 * | 9/2019 | ........... | G06F 16/683 |

OTHER PUBLICATIONS

G. Oltean, L. Grama, L. Ivanciu and C. Rusu, "Alarming events detection based on audio signals recognition," 2015 International Conference on Speech Technology and Human-Computer Dialogue (SpeD), Bucharest, Romania, 2015, pp. 1-8, doi: 10.1109/SPED.2015.7343106. (Year: 2015).*
Extended European Search Report dated Aug. 28, 2020 for European Patent Application No. 20159770.5.
Nair et al, "Detection of Audio-based Emergency Situations using SCALE" (Jun. 14, 2019).
Ali et al, "Car Accident Detection and Notification System Using Smartphone," International Journal of Computer Science and Mobile Computing, vol. 4 Issue.4, p. 620-635 (Apr. 2015).
Communication pursuant to Article 94(3) EPC dated Jan. 24, 2022 for European Patent Application No. 20159770.5.
Communication pursuant to Article 94(3) EPC dated Mar. 16, 2021 for European Patent Application No. 20159770.5.

* cited by examiner

METHOD, SOFTWARE, AND DEVICE FOR TRAINING AN ALARM SYSTEM TO CLASSIFY AUDIO OF AN EVENT

TECHNICAL FIELD

The present invention relates to training of an alarm system. In particular, it relates to training of an alarm system to classify audio of an event.

BACKGROUND

Modern alarm systems are becoming more advanced and may include a microphone to detect new types of events that are indicative of e.g. a burglary. However, this advancement has also resulted in more false alarms. False alarms are costly and lowers the reliability of the alarm system. However, a balance should be found to not miss an actual event.

When training an alarm system, it may be difficult to identify correct data to be used as training data and to adapt the system once installed.

Thus, there is a need for improved training of the alarm system.

SUMMARY

According to a first aspect, a method for training an alarm system to classify audio of an event is provided. The alarm system is connected to a neural network trained to classify audio as an event type. The method comprises steps of: receiving audio recorded during a first period of time; transmitting the audio to an external unit; receiving data from the external unit indicating a sub-period of time of the audio and data indicating an event type of the indicated sub-period of time of the audio; and re-training the neural network by inputting a sub-period of the audio corresponding to the indicated sub-period of time of the audio and using the indicated event type as a correct classification of the sub-period of the audio.

By the present method, an accurate and efficient training of an alarm system may be achieved. By involving an external unit, further intelligence may be provided at the external unit for correctly identify and classify audio indicating a particular event type. Consequently, accurate data may be received from the external unit and used to train the neural network at the alarm system. The accurate data may thus be independently verified by the external unit to allow for more robust training. The event may be any event that may trigger an alarm, such as a burglary, fire or break-in and may be indicated by a label or a Boolean. The sub-period of time of the audio comprises the time of the event and may be indicated in the data received by the alarm system from the external device by time stamps or an audio clip.

The method may further comprise the steps of: recording video during the first period of time; and transmitting the video to the external unit. Thereby more information may be extracted and used by the external unit such that the data received from the external unit is more accurate. The additional analysis at the external unit may comprise performing image analysis of the video to better identify the event type or comparing the video and the audio to more accurately identify the sub-period of time of the audio. Other sensors in connection with the alarm system such as motion detectors may be used in a similar manner.

The method may further comprise a step of analyzing the audio by inputting the audio into the neural network, wherein the neural network outputs a suggested event type of the recorded audio; and wherein the step of transmitting the audio further comprises transmitting data indicating the suggested event type of the audio. Thereby a smaller analysis burden may be put on the external unit and the results may be improved. The data indicating the suggested event type of the audio may for example be used as a start value for any type of analysis provided at the external device.

The received data indicating an event type may comprise a verification of the suggested event type of the audio, for example using a Boolean value. Thereby the communication between the external device and the alarm system may be more efficient and reduces the load of the network.

The method may further comprise steps of: recording audio during a second period of time comprising the first period of time; and analyzing the recorded audio to identify audio indicating an event, wherein the audio recorded during the first period of time comprises the audio indicating an event. Thereby more control over the audio is achieved by the alarm system by identifying the first period of time. This control enables better training and lowers the requirements of the external unit.

The step of analysing the recorded audio may further comprise identifying audio indicating a conversation, wherein the audio recorded during the first period of time excludes the audio indicating a conversation. Thereby privacy of a resident is protected while further improving the audio analysis in that normal conversations will usually not occur during an event that may trigger an alarm.

The step of transmitting the audio to the external unit may further comprise transmitting coordinates of the alarm system. Thereby more information may be used to determine e.g. the event type by the external unit. Moreover, this embodiment may further enable an automatic response to the event by e.g. directing a fire truck to the transmitted coordinates.

The neural network may comprise n>1 layers, and the step of re-training the neural network comprises re-training only the last k>0 layers without changing the initial n−k layers, wherein n>k. Thereby the re-training is more efficient as the last few layers are usually the ones most relevant for re-training. n may be 2, 3, 10, 20 or any other suitable number. k may be 1, 2, 3 or any other suitable number.

The method may further comprise a step of communicating the data received from the external unit to another alarm system. Thereby other alarm systems may learn from the same event, improving the training by enabling more data to be processed. As an alternative, the neural network or at least the last few layers of the neural network may be communicated to another alarm system after being re-trained.

The step of communicating the data may comprise analysing the data indicating an event type and communicating the data received from the external unit to another alarm system that is determined to be interested by the indicated event type. Thereby the communication only occurs to alarm systems for which the information is relevant. This may comprise not sending data related to fires to alarm systems in stone buildings or only sending data to alarm systems in similar locations, e.g. store locations will not receive data relating to events in residences.

According to a second aspect a non-transitory computer readable recording medium is provided. The non-transitory computer readable recording medium having recorded thereon program code which when executed at a device having processing capabilities is configured to perform the method according to first aspect.

According to a third aspect a device for classifying audio of an event detected by an alarm system is provided. The alarm system is connected to a neural network trained to classify audio as an event type. The device comprises: a first receiver configured to receive audio recorded during a first period of time; a transmitter configured to transmit the audio to an external unit; a second receiver configured to receive data from the external unit indicating a sub-period of time of the audio and data indicating an event type of the indicated sub-period of time of the audio; and a processing circuit configured to re-train the neural network by inputting a sub-period of the audio corresponding to the indicated sub-period of time of the audio and using the indicated event type as a correct classification of the sub-period of the audio.

The device may further be configured to analyse the recorded audio by inputting it into the neural network, wherein the neural network outputs a suggested event type of the recorded audio; wherein the transmitter is further configured to transmit data indicating the suggested event type of the audio; and wherein the second receiver is configured to receive data from the external unit is further configured to receive a verification of the suggested event type of the audio.

The device may further be configured to: receive audio recorded during a second period of time comprising the first period of time; and analyse the recorded audio to identify audio indicating an event, wherein the audio recorded during the first period of time comprises the audio indicating an event.

According to a fourth aspect a system is provided comprising at least two devices according to the third aspect. Each device is further configured to communicate the data received from the external unit to each other.

The second, third and fourth aspect may generally have the same features and advantages as the first aspect.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present teachings will now be described in more detail, with reference to appended figures showing embodiments. The figures should not be considered limiting; instead they are used for explaining and understanding.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION

The present teachings will now be described more fully hereinafter with reference to the accompanying drawings, in which currently preferred embodiments shown. The claims may, however, be embodied in many different forms and should not be construed as limited to the embodiments set forth herein; rather, these embodiments are provided for thoroughness and completeness, and to fully convey the scope of the claims to the skilled person.

Figure 1:
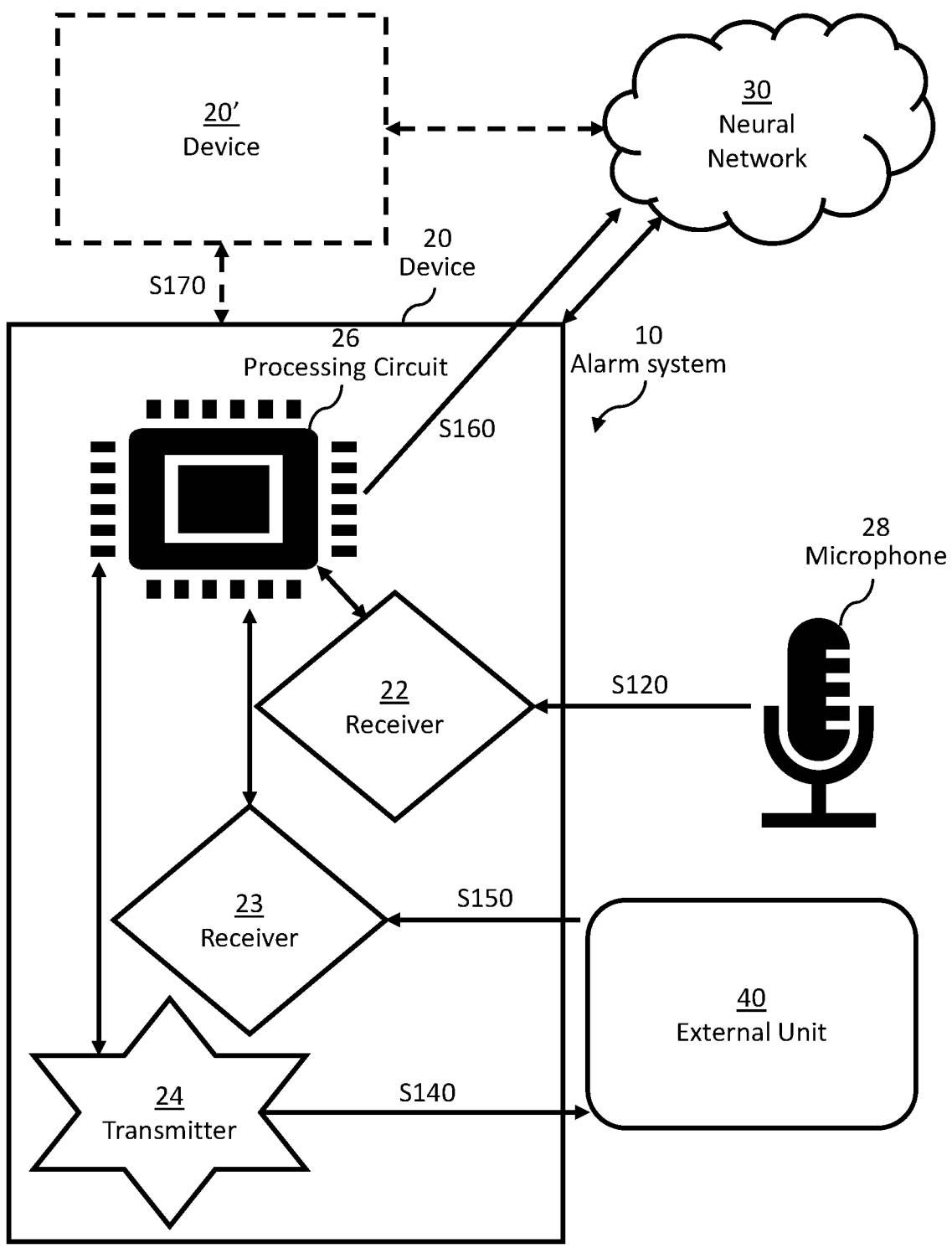
FIG. 1 illustrates an alarm system.

FIG. 1 illustrates an alarm system 10. The alarm system 10 in this embodiment comprises a device 20 and a microphone 28. In alternative embodiments, the microphone 28 is not part of the alarm system 10 and a neural network 30 is. The arrows represent connections that may be realised by the components being incorporated into the same unit or by known communication means.

The alarm system 10 is configured to detect an event that may trigger an alarm and trigger said alarm. The alarm may comprise sound, light and/or notifying emergency services and/or a security company.

The alarm system 10 comprises a device 20 for classifying audio of an event detected by the alarm system 10. The device 20 may be a single or several units comprising any number of components.

The device 20 is connected to a neural network 30 trained to classify audio as an event type. An event type may be a burglary, fire or any other suitable type of event that triggers the alarm. The neural network 30 may be pre-trained during manufacturing and continually re-trained while the alarm system 10 is in use. The re-training may be personalized and/or make use of data from other alarm systems. In an alternative embodiment, the device 20 comprises the neural network 30.

The neural network 30 may be of any type, such as a convolutional, recurrent or feedforward neural network or a multilayer perceptron, and may comprise a mix of different types.

The device 20 comprises a first receiver 22 configured to receive audio recorded during a first period of time. The first receiver 22 may be any type of receiver, including wired or wireless.

The first period of time comprises the time of the event triggering the alarm. The first period of time may further comprise times of relevant audio, such as footsteps approaching or glass breaking. The first period may be continuous or a set of time periods that may or may not overlap.

The device 20 may comprise or be connected to a microphone 28 configured to record audio. The audio recorded is transmitted to the receiver 22. The device 20 may further comprise any number of other sensors, such as a video camera or a motion detector, which provide the receiver 22 with more data.

The audio may be recorded during a second period of time comprising the first period of time. The recorded audio may then be analyzed by a processing circuit 26 or neural network 30 connected to the alarm system 10 to identify audio indicating an event, wherein the audio recorded during the first period of time comprises the audio indicating an event.

This involves first recording for a longer [second] period of time [e.g. the period of time of 0-10], then analysing the recording to extract audio indicating an event [that is recorded during the first period of time, e.g. the period of time of 3-8].

The audio indicating an event may be identified during analysis by a processing circuit 26 or neural network 30 as any audio above a pre-determined volume threshold or by using audio analysis and/or machine learning algorithms to find audio indicating e.g. screams, glass breaking or wood crackling. This allows the alarm system 10 to identify the audio indicating an event to be comprised in the first period of time.

The analysis by a processing circuit 26 or neural network 30 may in further embodiments instead be performed by the microphone 28, the receiver 22 or another separate unit in communication with the device 20.

The analysis of the recorded audio may further comprise identifying audio indicating a conversation, and wherein the audio recorded during the first period of time excludes the audio indicating a conversation.

By excluding conversations, the privacy of a resident is protected while further improving the audio analysis in that normal conversations will usually not occur during an event that may trigger an alarm.

The device 20 comprises a transmitter 24 configured to transmit the audio to an external unit 40. The transmitter 24 may be any type of transmitter, including wired or wireless.

The audio transmitted may be a continuous clip of audio or a set of audio clips within the first period of time that may or may not overlap. The transmitted audio may or may not be encoded and/or compressed.

The transmitter 24 may further transmit coordinates of the alarm system 10 to the external unit 40. Thereby, more information may be used to determine e.g. the event type while also enabling an automatic response to the event by e.g. directing a fire truck to the transmitted coordinates.

The device 20 comprises a second receiver 23 configured to receive data from an external unit 40 indicating a sub-period of time of the audio and data indicating an event type of the indicated sub-period of time of the audio. This functionality may be achieved by the same unit as the first receiver 22 configured to receive audio or a different one.

The sub-period of time of the audio is preferably only the period of time of the event triggering the alarm and/or periods of time of relevant audio and may be indicated by time stamps or an audio clip. This corresponds to the external unit 40 having excluded non-relevant parts of the first period of time such that all that is left is suitable for training a neural network 30 as described below. The event type may e.g. be a class such as break-in or fire and may be indicated by a label or one or more Booleans.

The sub-period of time of the audio may correspond to one of a plurality of audio clips transmitted to the external unit 40 by the transmitter 24. This corresponds to the external unit 40 having chosen one of the transmitted audio clips as being the one comprising or most likely to comprise the event triggering the alarm.

The second receiver 23 and the transmitter 24 are thus in communication with the external unit 40.

The external unit 40 may be a station controlled by a human operator. In this embodiment, the audio transmitted to the external unit 40 is presented to the operator in such a way to assist the operator in performing the technical task of indicating a sub-period of time of the audio and indicating an event type of the indicated sub-period of time of the audio.

The audio is presented as waveform graphs in order to facilitate fast analysis [instead of waiting for the audio to play], comparison of several audio segments or versions at once and is a format more suited to human brain processes.

This guided human-machine interaction process is achieved in part by the selection of what information to present to the operator. The audio shown to the operator comprises a relevant event and may be accompanied by a suggested event type of the audio and/or further data such as the location and history of the alarm system 10 and/or information from other sensors [such as video data] to further guide the operator.

The audio may be manipulated using pre-processing by the device 20 and/or the neural network 30 to e.g. accentuate or isolate the most relevant features of the audio. Several different audio clips may be transmitted to the external device 40 that comprise different audio events or the same audio event manipulated in different ways by the device 20 or another external processor. Different manipulation may more easily accentuate relevant features of a specific type of event, so by presenting several of these, the operator of the external device 40 will always have the option of viewing the objectively best possible manipulation. This varying degree of efficiency of the manipulation may be achieved in a technical and objective manner, e.g. by using different filters in a specific combination and sequence in the same manner as in a convolutional neural network.

This guided human-machine interaction process may further be achieved in part by how the information is presented to the operator. The audio clip[s] are visually shown together with pre-determined standard audio examples that correspond to different event types, which may comprise false positives and/or the most likely event types. False positives are events not relevant for the alarm system 10 that are likely to be confused with events that are relevant, which are determined either historically or algorithmically or pre-determined. The standard audio examples may be shown in the same view as the transmitted audio clip[s] or may visually overlap the audio clip[s]. By displaying the audio clip[s] visually in waveform format, several may be analyzed at once by a human in a way that would otherwise not be possible. This guides the operator to identifying the event type[s] of the audio clip[s] in a fast, efficient and heuristic manner.

In other embodiments, the external unit 40 is an external processor. The processor may use machine learning or pattern recognition algorithms to analyze the transmitted audio clip[s] in a similar manner as the operator above, i.e. by comparing them to pre-determined standard audio examples. These embodiments are differentiated from the human operator in that the audio clip[s] may be analyzed in their audio format instead of or in addition to a visual waveform format.

A further embodiment that is compatible with either type of external unit 40, is that the external unit 40 waits for the result of the event and indicates this result to the device 20. This may comprise checking police reports for what occurred at the time and/or location of the event or waiting for it to be manually entered by e.g. a fireman or owner of the alarm system 10. In the case of a human operator, it is preferred that they manually enter the result after verifying it in either of these manners, in order to reduce human error by eliminating any active choice by the human operator during verification.

The device 20 may be configured to pre-process the recorded audio before transmitting it. This is done by analyzing the recorded audio by inputting it into the neural network 30, wherein the neural network 30 outputs a suggested event type of the recorded audio. The transmitter 24 then transmits data indicating the suggested event type of the audio. As a result, the second receiver 23 may receive a verification [positive or negative] of the suggested event type of the audio. In case of a negative verification, the correct event type may also be transmitted from the external device 40 to the device 20.

This affects the way the external unit 40 handles the transmitted audio, in that it will verify the suggested event type of the audio. This lowers the requirements of the external unit 40 in that its analysis may start by verifying the suggested event type and if the verification is positive, the analysis is finished, and the verification may be sent to the second receiver 23. The verification may be a binary or Boolean positive or negative verification or may comprise a confidence value of the likelihood of the suggested event type being accurate.

Starting by verifying the suggested event type may comprise comparing the transmitted audio to pre-determined standard audio examples that correspond to the suggested event type.

If the verification is negative, i.e. that the external unit 40 does not agree that the transmitted audio has the event type of the suggested event type, the external unit 40 may continue as normal or ask the device 20 to suggest another event type.

The device 20 comprises a processing circuit 26 configured to re-train the neural network 30 by inputting a sub-period of the audio corresponding to the indicated sub-period of time of the audio and using the indicated event type as a correct classification of the sub-period of the audio.

Re-training the neural network 30 comprises re-evaluating weights and functions of the neural network 30 based on the new data. The indicated event is the event type of the audio indicated by the external unit 40 and is assumed to be correct.

The neural network 30 may comprise n>1 layers, and re-training the neural network 30 may comprise re-training only the last k>0 layers without changing the initial n–k layers, wherein n>k.

In order to prevent the initial n–k layers from changing, the weights of these layers may either be saved and restored after the re-training or kept from changing, e.g. by inputting the new data into the last k>0 layers following the initial n–k layers.

The device 20 may be in communication with another alarm system 10, such as the dashed device 20'. This allows for data generated by one alarm system 10 to train the neural network 30 of other alarm systems 10, thereby improving the training by enabling more data to be processed.

The communication may comprise sending the data received from the external unit 40 and/or the entire re-trained neural network 30 or at least the last k>0 layers of the neural network 30 after being re-trained.

The communication may be directed to a specific sub-set of other alarm systems 10. This may comprise analysing the data indicating an event type and only communicating with another alarm system 10 that is determined to be interested by the indicated event type. For example, an alarm system 10 installed in a stone building may not be interested in data relating to fires.

It may further comprise only communicating with alarm systems 10 of a similar type, such that the neural network 30 becomes specialised to a specific type of alarm system 10. A similar type may comprise being suitable for or installed in a warehouse, store, office or residence. In this manner, the alarm system 10 may be personalised without having to collect data over a relatively long period of time, as several similar alarm systems 10 may cooperate. The communication may also be limited in other manners, e.g. only between alarm systems 10 with the same operator.

A plurality of devices 20 communicating with each other may be considered a single system, wherein each device 20 is configured to communicate the data received from the external unit 40 to each other.

The system may further or alternatively be defined by all devices 20 being connected to the same neural network 30 and/or configured to update a respective neural network 30 using the same data [e.g. either by inputting the same data received and distributed in the system or by communicating the last k>0 layers of a re-trained neural network 30].

Figure 2:
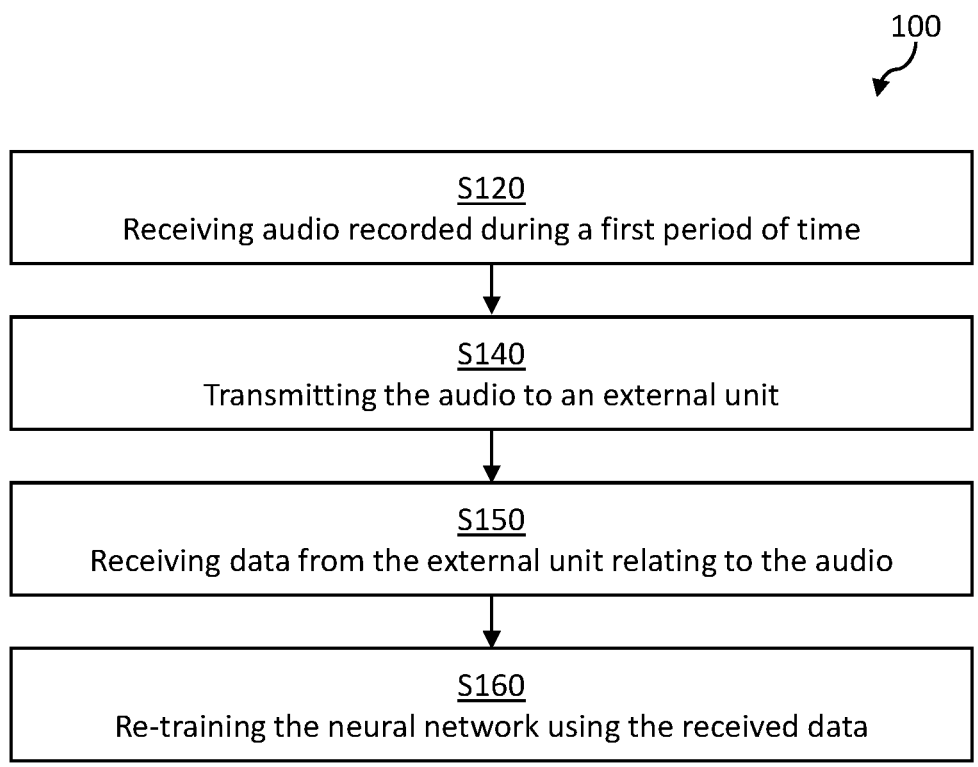
FIG. 2 illustrates a method for training an alarm system to classify audio of an event.

FIG. 2 illustrates a method 100 for training an alarm system 10 to classify audio of an event. Below, this method 100 will be discussed in conjunction with FIG. 1. The method 100 comprises a number of steps. There may be further, optional steps and steps may occur in an order different from the ones shown in the figures.

The first step of the method 100 of FIG. 2 is a step of receiving S120 audio recorded during a first period of time. This may be achieved by recoding audio with a microphone 28, receiving an audio transmission through a receiver or any other suitable manner. This step may thus be performed by a single or several circuits or components in a single or several units. The step of receiving S120 audio may further comprise receiving other types of data, such as metadata, video or motion data.

The next step of the method 100 of FIG. 2 is a step of transmitting S140 the audio to an external unit 40. The audio transmitted at least partially corresponds to the audio received in the step of receiving audio 120. The external unit 40 is a trusted unit that is separate from the alarm system 10 and may or may not be locally connected to the alarm system 10. The step of transmitting the audio 140 may further comprise encrypting, compressing and/or processing the audio before the transmission.

The next step of the method 100 of FIG. 2 is a step of receiving S150 data from the external unit 40 indicating a sub-period of time of the audio and data indicating an event type of the indicated sub-period of time of the audio. The sub-period of time is a sub-portion of the first period of time that, according to analysis performed by the external unit 40, comprises an event of the indicated event type. The step of receiving S150 data may comprise decrypting and/or decompressing the data.

The final step of the method 100 of FIG. 2 is a step of re-training S160 a neural network 30 by inputting a sub-period of the audio corresponding to the indicated sub-period of time of the audio and using the indicated event type as a correct classification of the sub-period of the audio. Thereby, the neural network 30 learns that the sub-period of the recorded audio corresponds to the indicated event and is trained to recognize it [better] in the future.

Figure 3:
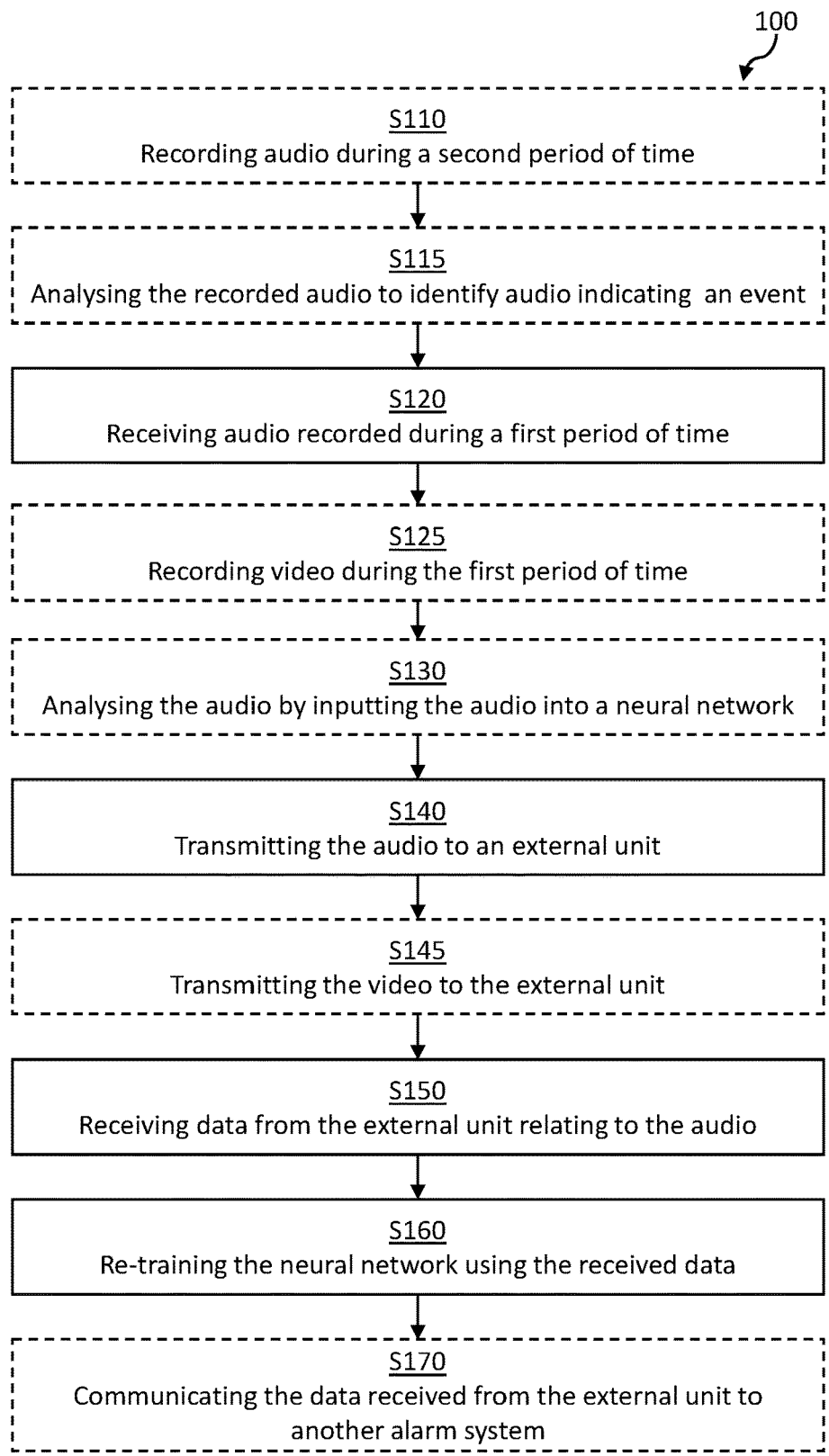
FIG. 3 illustrates a method for training an alarm system to classify audio of an event.

FIG. 3 illustrates a method 100 for training an alarm system 10 to classify audio of an event. Below, this method 100 will be discussed in conjunction with FIG. 1. The dashed lines in FIG. 3 indicate optional steps. The optional steps, added in comparison to FIG. 2, are as follows.

The first optional step is a step of recording S110 audio during a second period of time comprising the first period of time. This may comprise continually or periodically recording audio.

The next optional step is a step of analyzing S115 the recorded audio to identify audio indicating an event, wherein the audio recorded during the first period of time comprises the audio indicating an event. This allows the method 100 to identify the audio indicating an event to be comprised in the first period of time.

This analysis may comprise audio processing performed by a processing circuit 26. This may comprise transforming the audio into a frequency domain using e.g. Fourier or Laplace transforms, then manipulating the data using e.g. convolution and multiplication according to known audio processing techniques.

Alternatively, or in addition, the analysis comprises finding audio above a pre-determined volume or energy threshold or comprising audio indicative of an event such as screams, glass breaking or wood crackling. Depending on the embodiment, this may be easier or harder to do in the frequency domain.

The next optional step is a step of recording S125 video during the first period of time. This is performed by a camera that may be a part of the alarm system 10 or a separate system in communication with the alarm system 10.

The next optional step is a step of analysing S130 the audio by inputting the audio into the neural network 30, wherein the neural network 30 outputs a suggested event type of the recorded audio.

As the neural network 30 is trained to classify audio of an event, it may be used to lower the requirements of the external unit 40. The external unit 40 may thereby conserve considerable computation and/or reduce errors, however a balance must be struck not to rely solely on the neural network 30 before it has been thoroughly trained.

As an alternative, the step of analysing S130 the audio may use audio processing by a processing circuit 26 instead of a neural network 30 to find a suggested event type of the recorded audio. The analysis may comprise transforming the audio into a frequency domain using e.g. Fourier or Laplace transforms, then manipulating the data using e.g. convolution and multiplication according to known audio processing techniques. The results of the audio processing may then be compared to pre-determined standards or using machine learning, to find a suggested event type of the recorded audio.

As a result of the step of analysing S130 the audio, the step of transmitting S140 the audio further comprises transmitting data indicating the suggested event type of the audio to the external unit 40. The next optional step is a step of transmitting S145 the video to the external unit 40. This allows the external unit 40 to have more information when identifying the event type of the audio. If specific parts of the audio are transmitted, the corresponding parts of the video may also be transmitted, i.e. the same period[s] of time. If the alarm system 10 comprises or has access to other types of sensors, such as a motion detector, this data may also be transmitted in a similar manner.

The final optional step is a step of communicating S170 the data received from the external unit 40 to another alarm system 10. This allows other alarm systems 10 may learn from the same event, improving the training by enabling more data to be processed.

As an alternative, the neural network 30 or at least the last few layers of the neural network 30 may be communicated to another alarm system 10 after being re-trained.

The step of communicating S170 the data may comprise analyzing the data indicating an event type and communicating the data received from the external unit 40 to another alarm system 10 that is determined to be interested by the indicated event type.

This may comprise not sending data related to fires to alarm systems 10 in stone buildings or only sending data to alarm systems 10 in similar locations, e.g. store locations will not receive data relating to events in residences.

The method 100 may be stored by computer program product comprising a computer-readable storage medium with instructions adapted to carry out the method 100 when executed by a device having processing capability.

Additionally, variations to the disclosed embodiments can be understood and effected by the skilled person in practicing the claims, from a study of the drawings, the disclosure, and the appended claims.

The invention claimed is:

1. A method for training an alarm system to classify audio of an event, wherein the alarm system is connected to a neural network trained to classify audio as an event type, the method comprising:
    detecting an event;
    transmitting audio recorded during a first period of time comprising a time of the event to an external unit;
    receiving data from the external unit indicating a sub-period of time of the audio and data indicating an event type of the indicated sub-period of time of the audio; and
    re-training the neural network while the alarm system is in use by inputting a sub-period of the audio corresponding to the indicated sub-period of time of the audio and using the indicated event type as a correct classification of the sub-period of the audio.

2. The method according to claim 1, further comprising:
    recording video during the first period of time; and
    transmitting the video to the external unit.

3. The method according to claim 1, further comprising: analysing the audio by inputting the audio into the neural network, wherein the neural network outputs a suggested event type of the recorded audio; and
    wherein the step of transmitting the audio further comprises transmitting data indicating the suggested event type of the audio.

4. The method according to claim 3, wherein the received data indicating an event type comprises a verification of the suggested event type of the audio.

5. The method according to claim 1, further comprising:
    recording audio during a second period of time comprising the first period of time; and
    analysing the recorded audio to identify audio indicating an event, wherein the audio recorded during the first period of time comprises the audio indicating an event.

6. The method according to claim 5, wherein
    analysing the recorded audio further comprises identifying audio indicating a conversation, and wherein the audio recorded during the first period of time excludes the audio indicating a conversation.

7. The method according to claim 1, wherein transmitting the audio to the external unit further comprises transmitting coordinates of the alarm system.

8. The method according to claim 1, wherein the neural network comprises n>1 layers, and the step of re-training the neural network comprises re-training only the last k>0 layers without changing the initial n−k layers, wherein n>k.

9. The method according to claim 1, further comprising: communicating the data received from the external unit to another alarm system.

10. The method according to claim 9, wherein: communicating the data comprises analysing the data indicating an event type and communicating the data received from the external unit to another alarm system that is determined to be interested by the indicated event type.

11. A non-transitory computer-readable storage medium with instructions adapted to carry out the method of claim 1 when executed by a device having processing capability.

12. A device for classifying audio of an event detected by an alarm system, wherein the device is connected to a neural network trained to classify audio as an event type, the device comprising:
- a transmitter configured to transmit audio recorded during a first period of time comprising a time of the event to an external unit;
- a receiver configured to receive data from the external unit indicating a sub-period of time of the audio and data indicating an event type of the indicated sub-period of time of the audio; and
- a processing circuit configured to re-train the neural network while the alarm system is in use by inputting a sub-period of the audio corresponding to the indicated sub-period of time of the audio and using the indicated event type as a correct classification of the sub-period of the audio.

13. The device according to claim 12, wherein the device is further configured to analyse the recorded audio by inputting it into the neural network, wherein the neural network outputs a suggested event type of the recorded audio;
- wherein the transmitter is further configured to transmit data indicating the suggested event type of the audio; and
- wherein the second receiver configured to receive data from the external unit is further configured to receive a verification of the suggested event type of the audio.

14. The device according to claim 12, wherein the device is further configured to:
- receive audio recorded during a second period of time comprising the first period of time; and
- analyse the recorded audio to identify audio indicating an event, wherein the audio recorded during the first period of time comprises the audio indicating an event.

15. A system comprising at least two devices according to claim 12, each device further being configured to communicate the data received from the external unit to each other.

* * * * *